United States Patent
Strauss

(10) Patent No.: US 12,468,913 B2
(45) Date of Patent: Nov. 11, 2025

(54) DYNAMICALLY RECONFIGURING A GLYPH FOR REDIRECTING A USER TO UPDATED CONTENT

(71) Applicant: salesforce.com, inc., San Francisco, CA (US)

(72) Inventor: Reed Strauss, Boulder, CO (US)

(73) Assignee: Salesforce, Inc.

( * ) Notice: Subject to any disclaimer, the term of this patent is extended or adjusted under 35 U.S.C. 154(b) by 939 days.

(21) Appl. No.: 17/649,211

(22) Filed: Jan. 28, 2022

(65) Prior Publication Data
US 2023/0244890 A1    Aug. 3, 2023

(51) Int. Cl.
*G06K 7/14*    (2006.01)

(52) U.S. Cl.
CPC ............. *G06K 7/143* (2013.01); *G06K 7/146* (2013.01)

(58) Field of Classification Search
CPC ...................................................... G06K 7/143
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

FOREIGN PATENT DOCUMENTS

| | | | | |
|---|---|---|---|---|
| CN | 111104685 A | * | 5/2020 | ......... G06F 16/9554 |
| CN | 114693070 A | * | 7/2022 | |

(Continued)

OTHER PUBLICATIONS

CN111104685A English (Year: 2020).*
CN114693070A English (Year: 2022).*
CN114707802A English (Year: 2022).*

*Primary Examiner* — Christle I Marshall
(74) *Attorney, Agent, or Firm* — Ingrassia Fisher & Lorenz, LLP

(57) ABSTRACT

A system, related operating methods, and computer-readable storage media are disclosed here. The disclosed subject matter relates to methods of accessing by a device a record of content about an asset based on information embedded in a glyph associated with the asset; determining whether a glyph reconfiguration process should be performed when accessing the record of content based on a status of an object linked to the record of content about the asset wherein the status of the object is caused to change based on a schedule configured within an asset profile associated with the asset; and applying the glyph reconfiguration process for reconfiguring the glyph in response to change caused to the status of the object that results in redirection of the device to updated content based on different information embedded in the glyph about the asset.

21 Claims, 9 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,985,437 B2 * | 3/2015 | Burkhart .......... G06K 19/06037 |
| | | 235/375 |
| 9,177,032 B2 * | 11/2015 | DeRoos .............. G06F 16/248 |
| 10,026,505 B2 * | 7/2018 | Lack .................... A61H 23/04 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0087609 A1 * | 4/2013 | Nichol ................ G06F 16/9554 |
| | | 235/375 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0091135 A1 * | 4/2014 | Burke, Jr. ............. G06Q 30/06 |
| | | 235/494 |
| 2016/0058996 A1 * | 3/2016 | Hoss .................... G16H 40/40 |
| | | 340/539.13 |
| 2020/0327386 A1 * | 10/2020 | Wang .................. G06F 16/9554 |
| 2021/0350923 A1 * | 11/2021 | McKirdy ......... G06K 19/06028 |

(56) References Cited

U.S. PATENT DOCUMENTS

2023/0147211 A1\* 5/2023 Soviero .............. G06Q 30/0627
705/26.7

FOREIGN PATENT DOCUMENTS

| CN | 114707802 | A | \* | 7/2022 | |
|----|-----------|---|---|--------|--|
| CN | 111316663 | B | \* | 8/2022 | ....... G06K 19/06112 |
| CN | 117873457 | A | \* | 4/2024 | .......... G06F 11/3612 |
| KR | 20050032748 | A | \* | 4/2005 | ............... G06K 7/14 |

\* cited by examiner

| Sample Formulas | | 310 QR code API | 320 deep link | 330 Dynamic record input |
|---|---|---|---|---|
| 1 | Details | IMAGE("http://api.qrserver.com/v1/create-qr-code/?size=75x75&data= | com.salesforce.fieldservice://v1/sObject/" + Id + | "/details","scan this") |
| 2 | Related | IMAGE("http://api.qrserver.com/v1/create-qr-code/?size=75x75&data= | com.salesforce.fieldservice://v1/sObject/" + Id + | "/related","scan this") |
| 3 | Edit | IMAGE("http://api.qrserver.com/v1/create-qr-code/?size=75x75&data= | com.salesforce.fieldservice://v1/sObject/" + Id + | "/edit","scan this") |
| 4 | Feed | IMAGE("http://api.qrserver.com/v1/create-qr-code/?size=75x75&data= | com.salesforce.fieldservice://v1/sObject/" + Id + | "/feed","scan this") |
| 5 | Products | IMAGE("http://api.qrserver.com/v1/create-qr-code/?size=75x75&data= | com.salesforce.fieldservice://v1/sObject/" + Id + | "/products","scan this") |
| 6 | Location | IMAGE("http://api.qrserver.com/v1/create-qr-code/?size=75x75&data= | com.salesforce.fieldservice://v1/sObject/" + Id + | "/location","scan this") |
| 7 | Create Service Report | IMAGE("http://api.qrserver.com/v1/create-qr-code/?size=75x75&data= | com.salesforce.fieldservice://v1/sObject/" + Id + | "/createservicereport","scan this") |
| 8 | Flow | IMAGE("http://api.qrserver.com/v1/create-qr-code/?size=75x75&data= | com.salesforce.fieldservice://v1/sObject/" + Id + | "/flow/api_name","scan this") |
| 9 | Quick action | IMAGE("http://api.qrserver.com/v1/create-qr-code/?size=75x75&data= | com.salesforce.fieldservice://v1/sObject/" + Id + | "/quickaction/api_name","scan this") |

DYNAMICALLY RECONFIGURING A GLYPH FOR REDIRECTING A USER TO UPDATED CONTENT

TECHNICAL FIELD

Embodiments of the subject matter described herein relate generally to cloud computing platforms, and more particularly, embodiments of the subject matter relate to systems and methods for dynamically reconfiguring a glyph displayed for a scan and associated with an asset that redirects a user via a deeplink embedded in the glyph to an updated record of a database system with content about the asset in response to a change of the asset status.

BACKGROUND

Access to content is provided using web applications and cloud applications that provide user services via the internet and other networks. Different websites and databases provide user access to content and the user can be permitted to swap between multiple devices such as a desktop device and a mobile device to access the content during the course of a task. In some instances, when accessing the content using different platforms on the desktop and the mobile device, the user may be required to perform additional steps for authentication and for searching for the content, this can prove to be cumbersome and discourage a seamless use of the multiple platforms by the user to complete the task. To alleviate this issue, especially when the user is trying to access the same content between platforms, the user may text a link via chat or email that points to the content on one platform access when using the other device. By sending the link via chat or email, the user can circumvent steps such as searching for the context or having to remember the content record name or can be prevented from exposing sensitive information surrounding the content when accessing it on a different device. Rather, the user uses a chat or email account on each device simply has to click on the link sent to the other device to access the content.

It is desirable to implement a dynamic link system that enables the automatic reconfiguring of a glyph displayed with an asset by changing the links and deeplinks embedded in the glyph enabling the user to access enterprise or in-app content using different devices with limited manual steps by a one-step or a lesser number of steps using a manual scan operation to capture and process the address data of the link embedded in the glyph.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 illustrates an exemplary data structure configured of a series of linked executable program codes that enables the user to be directed via scan operations of the reconfigured QR code to different or updated content of the glyph display system in accordance with various embodiments;

FIG. 4B illustrates another content view of an exemplary asset record displayed by the glyph display system of FIG. 1 in accordance with various exemplary embodiments;

FIG. 6A illustrates an exemplary display of the asset record that includes notification of initiation or launching of a change action of the asset profile in an asset record of the glyph display system in accordance with various embodiments;

FIG. 6B illustrates an exemplary diagram of a work order that is displayed by the user launching the new action as shown in FIG. 6A of the glyph display system in accordance with various embodiments;

DETAILED DESCRIPTION

Figure 1:
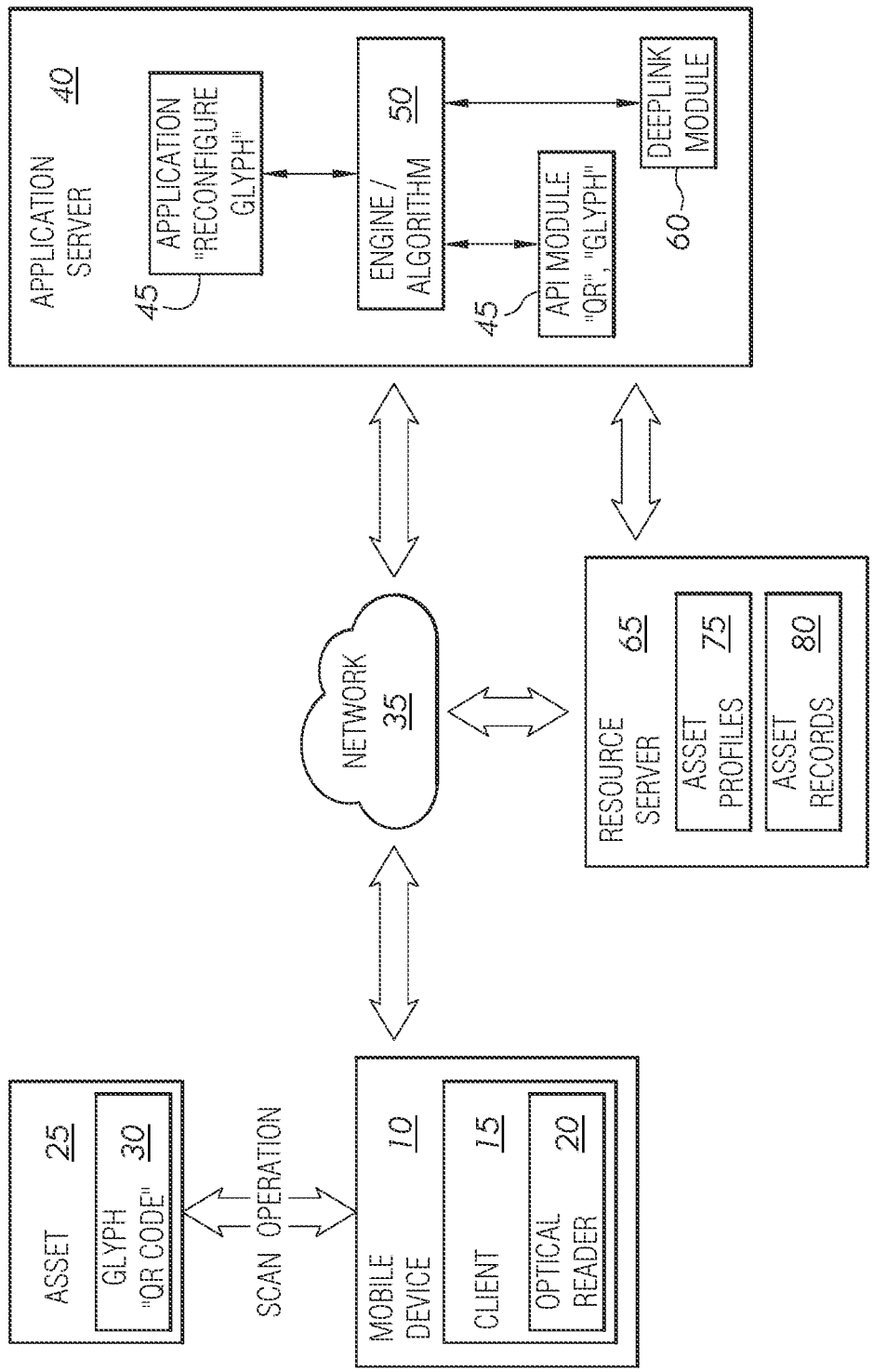
FIG. 1 is an exemplary block diagram that illustrates a glyph reconfiguration system in accordance with the disclosed embodiments.

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, the software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer require expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security, and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture, therefore, allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object, and "opportunities" object.

For some cloud-based computing platforms, customers of the platform can be assigned dedicated computing resources including application servers and production databases including primary databases and one or more standby databases. For example, in some cloud computing platforms that provide a multi-tenant database system, each tenant may be assigned their application server(s) and database(s) that are managed by the cloud computing platform. Individual tenant or customer databases of such multi-tenant database systems are typically configured in a relatively generic way. For example, individual tenant or customer databases may be configured (e.g., manually set) with generic system parameters, such as configuration settings, monitoring and alerting thresholds, etc. at the infrastructure component level based on infrastructure health or utilization. For instance, infrastructure layer configuration settings (e.g., size of compute virtual machines, storage, app servers, etc.) can be managed by the cloud computing platform, whereas upper layer application configuration setting can be managed by an administrator of an individual tenant (e.g., how many concurrent reports can a particular user account run, within this tenant).

The disclosed embodiments can provide technologies for dynamically reconfiguring a glyph system of a tenant based on statuses of an asset that are determined by profile(s) of the tenant (e.g., usage or timeline-based asset profile(s) of the tenant).

As used herein, the term "glyph" can refer to a graphic symbol that can be alphabetic, numeric, or some other form that pictures or contains encoded machine-readable code or encoded characters. For example, references to a glyph can include a matrix barcode, a two-dimensional barcode, a quick response (QR) code, or any code that can be scanned and contains a link or deeplink that allows a mobile user upon processing of the scanned code to be directed to address to access content that is linked for review. It is contemplated that the glyph and references to the QR code are dynamic codes that can be read by a variety of optical reader devices such as cameras configured with mobile devices such as smartphones. In the case of QR codes, scanning applications may be configured with clients on mobile devices for capturing and processing link and deeplink data contained or embedded in such codes or glyphs.

The database system described may be associated with a tenant of an enterprise and can be part of a multi-tenant database system. The database system of the tenant may be configured to include a database and an application server of the tenant.

One or more parts of the above implementations may include software. Software is a general term whose meaning can range from part of the code and/or metadata of a single computer program to the entirety of multiple programs. A computer program (also referred to as a program) contains code and optionally data. Code (sometimes referred to as computer program code or program code) contains software instructions (also referred to as instructions). Instructions may be executed by hardware to perform operations. Executing software includes executing code, which includes executing instructions. The execution of a program to perform a task involves executing some or all of the instructions in that program.

The mobile or electronic device (also referred to as a personal device, device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid-state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long-term storage and main memory, and thus the electronic device may have no or only a small amount of volatile memory for main memory.

In addition to storing code and/or data on machine-readable storage media, typical devices (e.g., mobile or electronic devices) can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that, when executed, cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end-user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., a person) that uses an electronic device. Software and/or services may use credentials to distinguish different accounts associated with the same and/or different users. Users can have one or more roles, such as administrator, programmer/developer, and end-user roles. As an administrator, a user typically uses electronic devices to administer them for other users, and thus an administrator often works directly and/or indirectly with server devices and client devices.

It is desirable to implement systems and methods that provide a dynamic generated glyph such as a QR code, or other bar or matrix code that automatically changes or is reconfigured upon a user instantiation using an optical device to scan an exemplary bar code and request content of an asset associated with the bar code based on predefined criteria or asset profile schedule that enables user access to updated asset content.

It is desirable to implement systems and methods that rely on scanning of bar codes that are reconfigurable with updated deep links embedded by a server application that redirects the user to new or updated content upon a scan operation by the user of the bar code.

It is desirable to implement systems and methods that display reconfigurable bar codes with an asset that allow for the user to manually scan the displayed bar code and receive access to updated content about the asset on another device such as a mobile device via a deep link that directs the client of the mobile device to in-app content for display.

It is desirable to enable systems and methods that eliminate a number of manual content access steps by providing a simplified and convenient solution for multi-platform content access for a user to scan a displayed bar code with the asset using a mobile device for updated content access about the asset.

It is desirable to implement a deep-link that is dynamically selected by a server-based application that enables a user to be redirected to updated content about the asset based on a reconfigured glyph which is automatically reconfigured based on a status object that is linked to the asset record for changing the content associated with the asset.

It is desirable to create a combination of toolsets for keeping users engaged by the automatic reconfiguring of glyphs displayed with assets for the user to recognize the available that is available of new content about the asset conveniently enabling the user access to updated content as the user transitions between a desktop and a mobile device or based on asset profiles that are used to automatically detect asset changes based on preconfigured events associated with asset usage or a timeline.

With reference to FIG. 1, FIG. 1 illustrates a diagram of an exemplary environment associated with the scanning, transfer, and access of updated content for distribution to a mobile device (from a desktop) where the updated content is associated with the asset and is made accessible by the user based on the scanning of a glyph displayed with the asset of a glyph reconfiguration system in accordance with the disclosed embodiments. FIG. 1 depicts a simplified system 100 having an application 45 type module that is hosted at a server 40 that is in communication with a resource server 65 that enables a process of implementing deeplink information that is contained in a glyph 30 (i.e., the glyph can be a QR code or other matrix code that is capable of storing a deeplink or link) that is displayed with an asset 25. Asset 25 may be a part, component, item, product, device, etc. . . . that the user desires to find more information. For example, asset 25 may be an operating component in use that requires maintenance which is dependent on the operating state of the component. In embodiments, the glyph 30 is configured to store a deeplink that is reconfigurable to enable the user upon scanning of the glyph 30 to be directed via the client 15 of the mobile device 10 to access updated content that is stored in an asset record 80 (or object) at a resource server 65.

Figure 7:
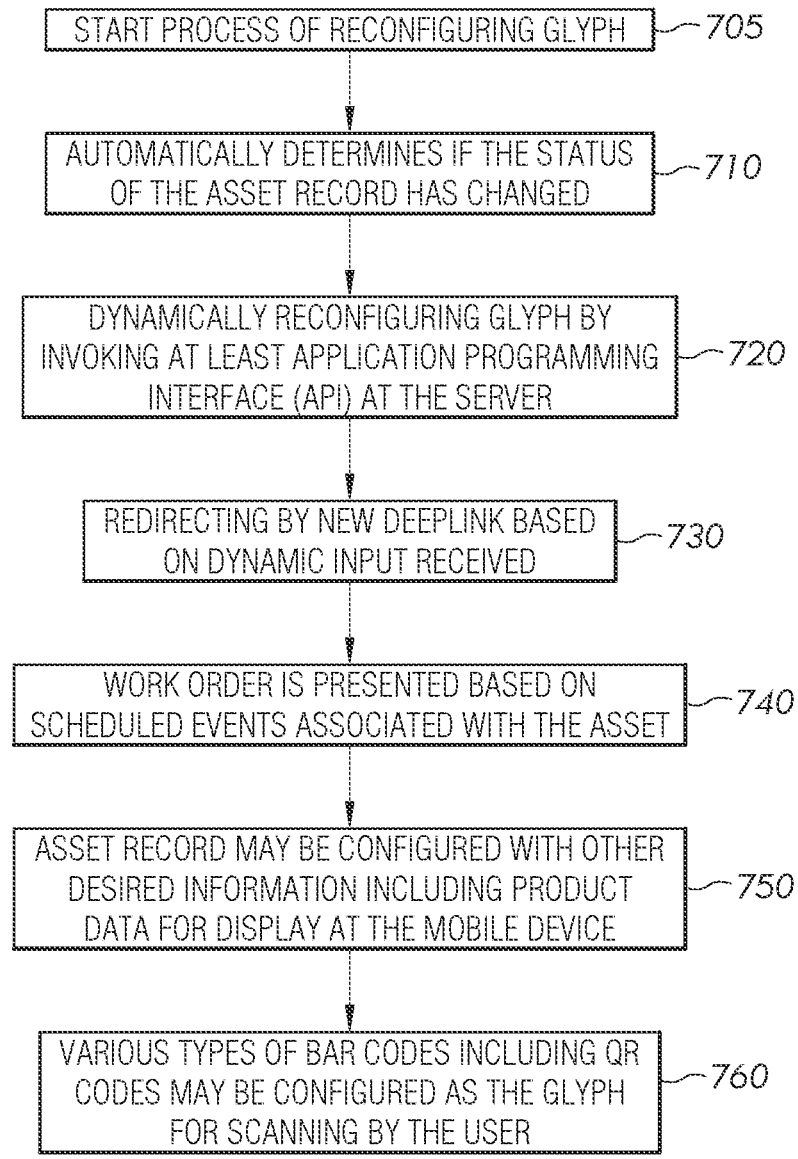
FIG. 7 illustrates an exemplary flowchart of embodiments of scanning and launching new action in response to status changes of the asset by a manual scanning operation by the user using the mobile device of a glyph display with the asset of the asset display system in accordance with various embodiments.

In embodiments, the system 100 may be deployed in the context of a multi-tenant application system such as the system described with respect to FIG. 7. Alternatively, system 100 may be deployed in an on-demand environment, a client-server network, a virtual machine-based system, a mobile network, etc. . . . FIG. 1 depicts the functional units that may be realized in system 100 that include hardware, processing modules, and software-based applications.

In embodiments, the mobile device 10 may be configured with an optical reader 20 capable of scanning by the mobile device 10, a glyph 30, matrix code, bar code, or the like to interpret the data within the scanned glyph 30 and perform various functions of sending a request and accessing content as directed by the data interpreted. As an example, client 15 is hosted on mobile device 90 with a mobile client 15 that is configured to enable the capture or scanning of a glyph displayed with an asset. For example, client 15 of the mobile device 10 may initiate an instance of an access or transfer request for content about the asset 25 using an application program interface (API) based on the data stored in the QR code by calling on a deeplink embedded in the QR code calling an application 45 at a server and opening a browser for displaying of content on a display of the mobile device 10.

Application 45 may be part of a multi-tenant environment that includes a processing engine of algorithm 50 that is configured to enable processing of a sample code containing a set of fields of a QR code API, a deeplink of an enterprise platform, and a dynamic record input. In embodiments, the QR code API executes a QR code module for generating a QR code that embeds an updated deeplink to redirect the user to new or updated content based on a change of status of the object linked to the asset record 80.

In an exemplary embodiment, asset 25 is a pump device that dependent on usage, an object linked to an asset record 80 for the pump device may be changed from a status "high" of a linked object to the asset record 80 indicative of a "high" mode of operation or usage, to a status "low" of the linked object to the asset record 80 indicative of a "low" operation or usage. In such instances, when a user scans the glyph 30 displayed or attached to the pump device, application 45 at server 40 performs a reconfiguration process that can consist of executing an algorithm 50 of a reconfiguration processing engine to determine if a status change has occurred from an instance of a prior scan operation by the user. If it is determined that a status change in the asset record 80 has occurred then application 45 implements a glyph reconfiguration process to reconfigure the glyph 30 to store or embed a different or new deeplink in a reconfigured glyph 30 for scanning by the mobile device 10 and redirecting the user to new or different content that is targeted or updated consistently with the change of status determined of the asset 25 (i.e., the pump device).

The new deeplink is generated by selecting a different deeplink via the deeplink selection module 55. An API module 60 is invoked to generate the reconfigured QR code. The status of asset 25 is controlled by asset profiles that are independently configured based on data received about the asset or by a third party in the multi-tenant environment to automatically change the status of the object linked to the asset record 80. The database 70 of the resource server 65 is configured to store asset profiles 75 and asset records 80. The asset records 80 can be configured with content for display and access by the mobile client 15 on a display of the mobile device 10 that is accessible via the deeplink embedded in the QR code scanned. individualization engine 110 and a multi-tenant database system 120. The database individualization engine 110 can be implemented as part of the multi-tenant database system 120, or externally to it. Acts and interactions corresponding to any of the features described above, and/or substantially equivalent acts and interactions, will now be described below. These acts and interactions can be performed by a computer processor, or multiple computer processors, in any form, that executes processor-readable instructions stored or included on a processor-readable medium.

Automated and Dynamic Reconfiguration of a glyph (i.e., QR code) displayed

When a client of a tenant scans a QR code displayed with an asset, an application that is served by the application server (i.e., the server 40), this causes a request to be sent to the server. The client is an end-user of the application and can be, for example, a customer of the tenant (or of an organization that the tenant is part of). In response to the request, server 40 can invoke one or more application programming interfaces (APIs) via (QR) API module 60. The invoked API(s) can generate and submit a deeplink database record to database 70.

In one embodiment, a set of executable code is configured by the algorithm 50 of the application 45 of link together a QR code API, a deeplink for the content of the asset, and a dynamic record input about the status of the asset to dynamically reconfigure the glyph in response to the status change of the dynamic record input (i.e., the status object linked to the asset record). As an exemplary embodiment, the user via a scanning operation initiates a request to the application 45 hosted at a server for content about asset 25. The glyph 30 that is scanned contains a deeplink that directs a user to access the asset record 80 of the content associated with the asset 25. In response to the instantiation of the request via the scan operation to the deeplink stored in the glyph 30 that enables the user to access the asset record 80 for content about the asset, the application 45 via a processing engine based on an algorithm 50 (or other intelligent solutions) automatically determines if a dynamic reconfiguration process of the glyph should be performed based on a status of an object (dynamic input of the asset) linked to the asset record 80 of content. The dynamic input or status of the object is automatically updated based on actions configured by asset profile 75 that include calendared actions, timetables, event-driven actions, usage, threshold, or any other scheduling thresholds or variables configured with the asset profile 75. For instance, multiple asset profiles may be stored at a resource server 65 and accessible by server 40. For example, server 40 may be configured in a multi-tenant environment with access to asset profiles of other tenants or a limited number of tenants. Alternatively, dynamic input of asset records may enable deeplinks configured for access to the content of other tenants including, for example, the third-party manufacturers with product information given access in an enterprise-based environment.

In the exemplary embodiment, by a change detected in the dynamic record input, or a change of the status of the object when contrasted to an initial scan operation by the user, the glyph is dynamically reconfigured by the application 45 by invoking an application programming interface (API) at the server to embed a different deeplink causing the user to be redirected to updated content (such as a work order or the like), and the displayed glyph reconfigured with a new embedded deeplink to serve up the more current or updated content.

Figure 2:
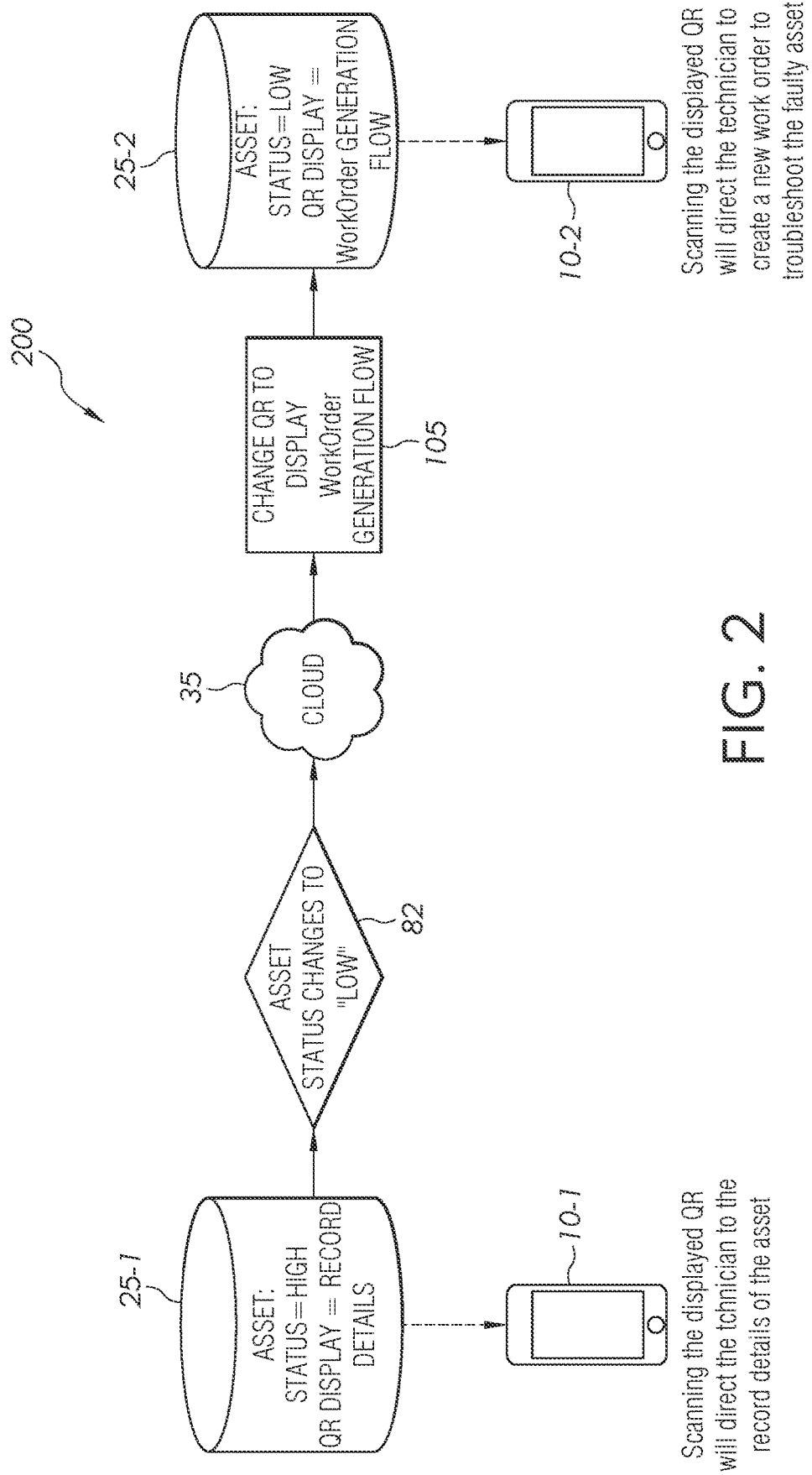
FIG. 2 is an exemplary diagram that illustrates operation flows associated with redirecting a user via a reconfigured glyph to updated content of the glyph display system in accordance with various embodiments.

FIG. 2 is an exemplary diagram that illustrates operation flows associated with redirecting a user via a reconfigured glyph to updated content of the glyph display system in accordance with various embodiments. As represented in FIG. 2, a mobile device 10-1 with an optical reader can scan a displayed glyph (i.e., QR code) to direct the user to record details about an asset 25-1. In this instance, the user manually scans a QR code and receives content about asset 25-1 of a status indicated as "high" of a status indicator in an asset record of the asset 25-1. In an operation flow, the status of the asset 25-1 is changed at action block 82 to an asset status indicative of "low" by an asset object linked (dynamic input) in the asset record. The asset change of status is transmitted via a cloud network 35 and a reconfigured QR code at block 105 is displayed to redirect the user upon scanning of the QR code to a work order. When the user, manually scans the reconfigured QR code via another scan operation by the mobile device 10-2, the asset record object at block 105 is changed to an asset status indicative of "low" and work order that is displayed on the mobile device 10-2. Hence, while the status of the asset is "high" the QR code displayed will direct the user to a basic asset record configured of content that includes content details of the asset 25-1. When the status of the asset is changed to "low", the database retrieves a different asset record that is directed to a work order and the user is directed to the work order via a different deeplink embedded in the glyph (i.e., the QR code in this case).

In reference to FIG. 3, FIG. 3 illustrates an exemplary data structure configured of a series of linked executable program codes that enables the user to be directed via scan operations of the reconfigured glyph or QR code to different or updated content of the glyph display system in accordance with various embodiments. In FIG. 3, in the embodiment, the exemplary data structure consists of executing or invoking a QR code API 310 via the application at the server that enables a deeplink 320 of an enterprise tenant to be embedded for directing to a dynamic record input 330 that is linked to a changed or different asset record with new or updated content of the asset.

Figure 4A:
FIG. 4A illustrates a content view of an exemplary asset record displayed by the glyph display system of FIG. 1 in accordance with various exemplary embodiments.

In reference to FIG. 4A, FIG. 4A illustrates a content view of an exemplary asset record displayed by the glyph display system of FIG. 1 in accordance with various exemplary embodiments. FIG. 4A shows an asset record 400 that includes exemplary content of product information 430-1 with a status object field 420-1 indicative of the current status "high" of the asset which determines the appropriate behavior changes of the QR code associated with the asset. The QR code display 410-1 is indicative of the status "high" and directs the user to a basic record page.

Figure 4B:
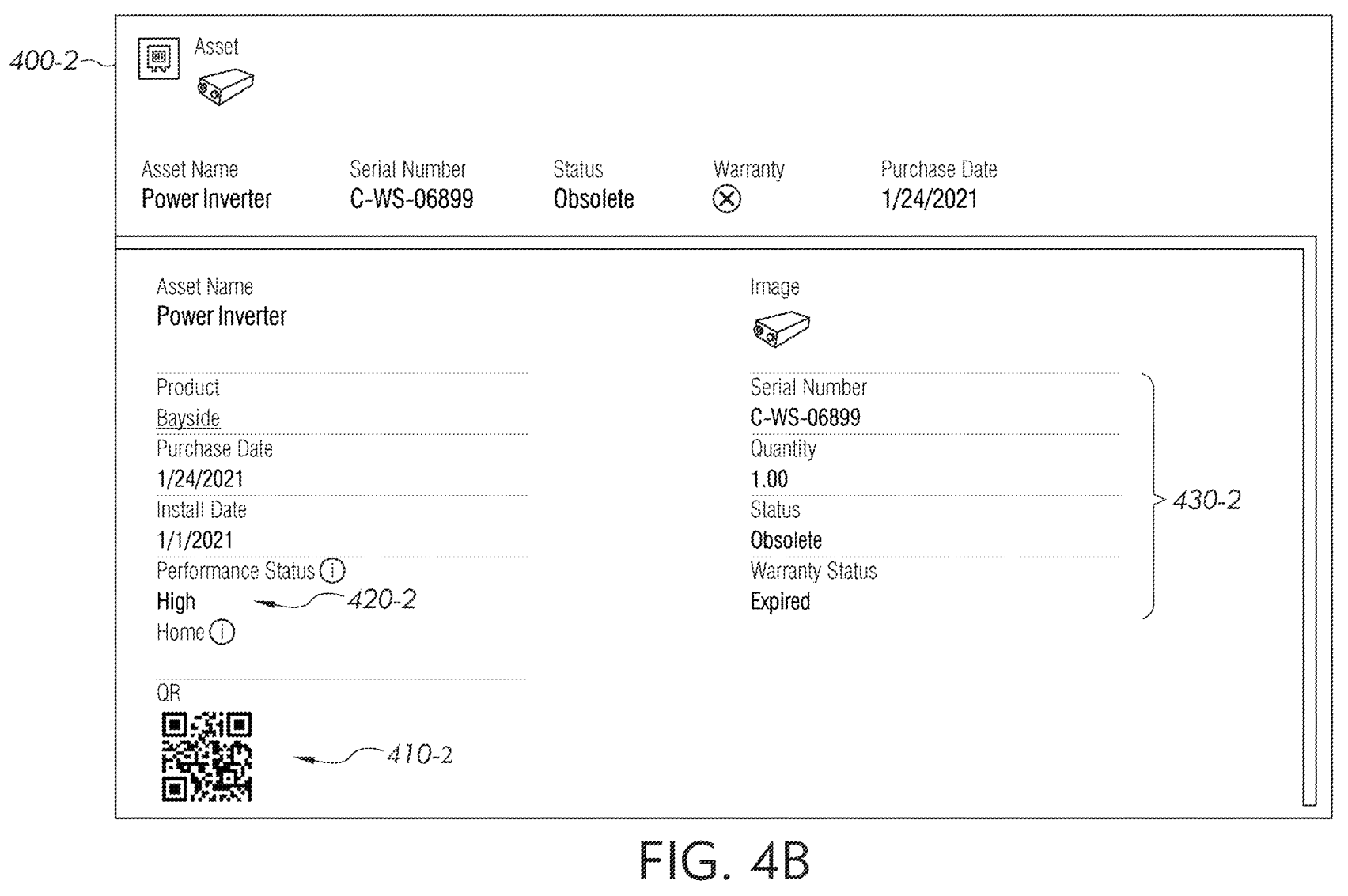

In reference to FIG. 4B, FIG. 4B illustrates another content view of an exemplary asset record displayed by the glyph display system of FIG. 1 in accordance with various exemplary embodiments. FIG. 4B shows an asset record 400-2 that includes exemplary content of product information 430-2 with a status object field 420-2 indicative of the current status "high" of the asset which determines the appropriate behavior changes of the QR code associated with the asset. The QR code display 410-2 is indicative of the status "high" and directs the user to a basic record page.

Figure 5B:
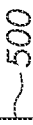
FIG. 5B illustrates an exemplary diagram of an asset record displayed with the asset profile that includes actions configurable for the asset of the glyph display system in accordance with various embodiments.
Figure 5A:
FIG. 5A illustrates an exemplary display of the asset record that includes the QR and content of the asset on a display of the mobile device of the glyph display system in accordance with various embodiments.

In reference to FIG. 5A, FIG. 5A illustrates an exemplary display of the asset record that includes the QR and content of the asset on a display of the mobile device of the glyph display system in accordance with various embodiments. In FIG. 5A, the QR code 505 is displayed within a field of view of a camera of mobile device that enables the execution of a client that includes an optical reader to read the QR code and direct the user to the content of a webpage of an asset record via a deeplink embedded in the QR code.

FIG. 5B illustrates an exemplary diagram of an asset record displayed with the asset profile that includes actions configurable for the asset of the glyph display system in accordance with various embodiments. In FIG. 5B, the asset record 500 includes asset profile configuration 510 with calendar, event, or timeline actions that are configurable for the asset that changes the behavior of the QR code that is displayed. The asset profile configuration 510 results in changes to the status object linked to the status field of the asset record 500 that causes the reconfiguring of the QR code when a user institutes a scan operation and change of the asset status is detected by the server application.

Figures 6A, 6B:
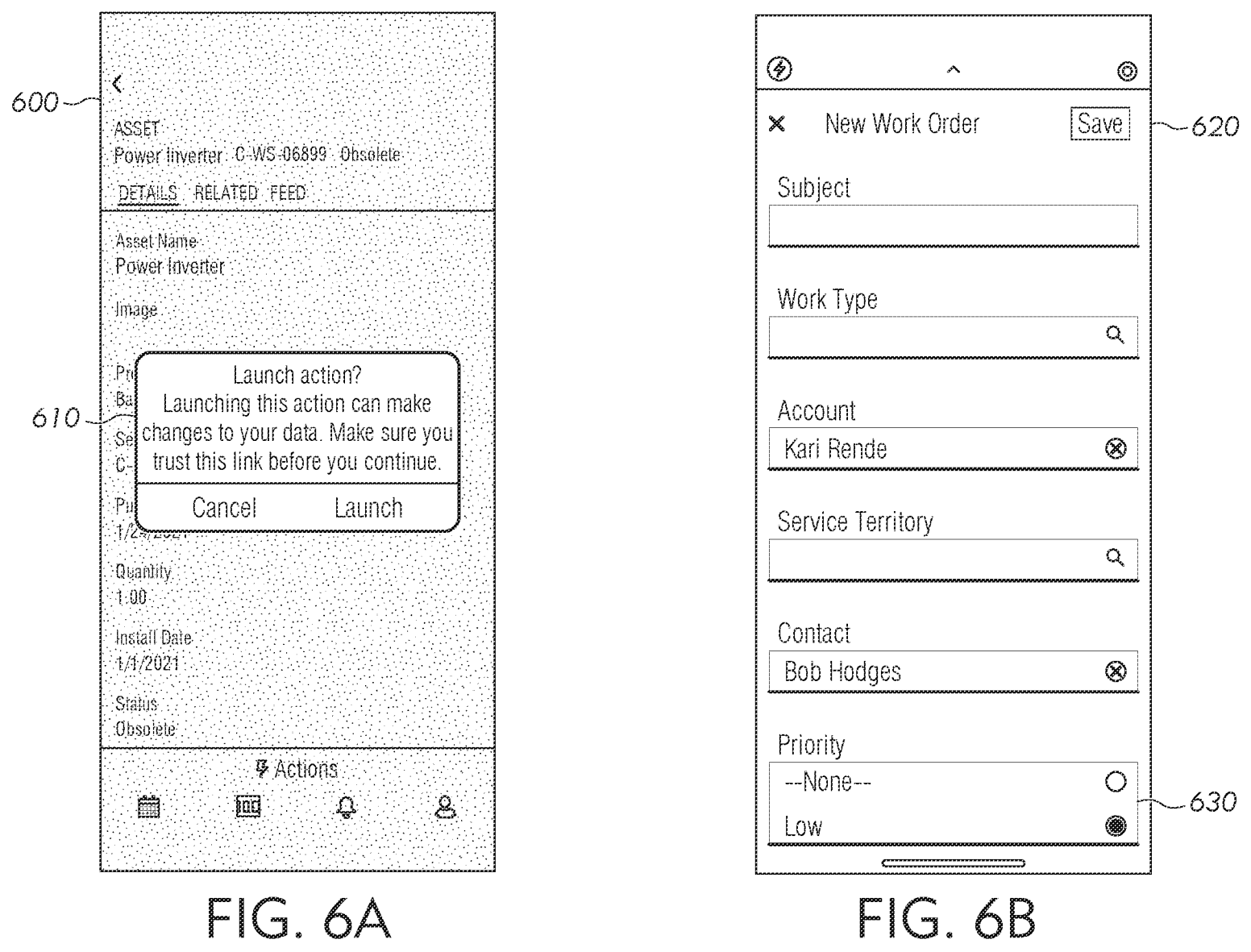

In reference to FIG. 6A, FIG. 6A illustrates an exemplary display of the asset record that includes notification of initiation or launching of a change action of the asset profile in an asset record of the glyph display system in accordance with various embodiments. In FIG. 6A, after the user has scanned the QR code, a display of the asset record 600 is shown with an overlay notification 610 that indicates to the user that the content displayed for the asset will be changed because of a new deeplink configured with the QR code. The user is given the option to either proceed with instituting or launching the new action, and changing the asset display record, or reverting (by canceling the launch) to the previous content displayed. If the user desires to cancel the launch, then the QR code is reconfigured back to the prior or original QR code with the original deeplink embedded. In the alternative exemplary embodiment, if the user does not desire to cancel the launching of the new action, the user is directed to another asset record (i.e., in this case, the work order).

FIG. 6B illustrates an exemplary diagram of a work order that is displayed by the user launching the new action as shown in FIG. 6A of the glyph display system in accordance with various embodiments. In FIG. 6B, the display of the asset record of the work order 620 is shown as viewed on the mobile device display with a priority status 630 that has been changed to "low".

FIG. 7 illustrates an exemplary flowchart of embodiments of scanning and launching new action in response to status changes of the asset by a manual scanning operation by the user using the mobile device of a glyph display with the asset of the asset display system in accordance with various embodiments.

In exemplary embodiments, in the flowchart of FIG. 7, at step 705, a dynamic glyph reconfiguration process is initiated by the user using a mobile device to initiate a request for content about an asset. That is, the user manually performs a scan operation using a camera or other optical reader via the client of the mobile that causes a content request to be launched based on the address data contained in the deeplink stored in the glyph displayed with the asset. At step 710, in response to an instantiation of the request to the deeplink to access the record of the content about the asset, the application at the server determines automatically if a dynamic reconfiguration process of the glyph should be performed based on a status of an object linked to the record of content. For example, the application determines based on the configuration of an asset profile that causes schedule changes to the asset record status, whether there is a change in the asset record, whether the object (i.e., dynamic record input) has been automatically changed. Each asset profile of a set of asset profiles for each asset is stored at a database containing asset records which can be part of a multi-tenant or enterprise database configured architecture to be shared between multiple users or tenants. At step 720, in response to a change of the status of the object linked to the asset record, the application implements a processing engine that applies an algorithm to dynamically reconfigure the glyph by invoking an application programming interface (API) at the server to embed a different deeplink to enable by the scan operation using an optical reader of a manual device by the user. The different deeplink redirects the user to updated or new content (i.e., keeps the user engaged by the updated information presented about the asset). In embodiments, the different deeplink may be embedded by the API in a reconfigured glyph for display with the asset. At step 730, the new or different deeplink is determined based in part on the dynamic input received or status change of the asset record, and by the algorithm (i.e., an intelligent algorithm) implemented that can include changes based on events, time, and usage of the asset.

At step 740, as an example, a scheduled event, or time-based occurrence can cause the API that is invoked by the application at the server to redirect the user via a new or different deeplink to the content of a work order for display at the mobile device. The reconfiguration process of the glyph may also be configured to dynamically adjust a selection of the deeplink as determined by a schedule of events or actions by various configured asset profiles that can cause a status change of the asset and suitable response (e.g., the directing of the user to an appropriate work order based on various attributes or thresholds associated with operating functions of the asset). The schedule may also contain a set of variables preprogrammed in accordance with an asset usage or timeline and configured with the asset profiles for triggering changes in the asset status. At step 750, the record of the content of the asset may be configured to include any information desired including manufacturing product information, service information, prior service dates, etc. . . . At step 760, the glyph may be configured in various types of matrix or bar codes that include any machine-readable code that can be used to store at least the deeplink. As an example, a bar code of a Quick Response (QR) code that is machine-readable and can be used to store at least the deeplink.

Figure 8A:
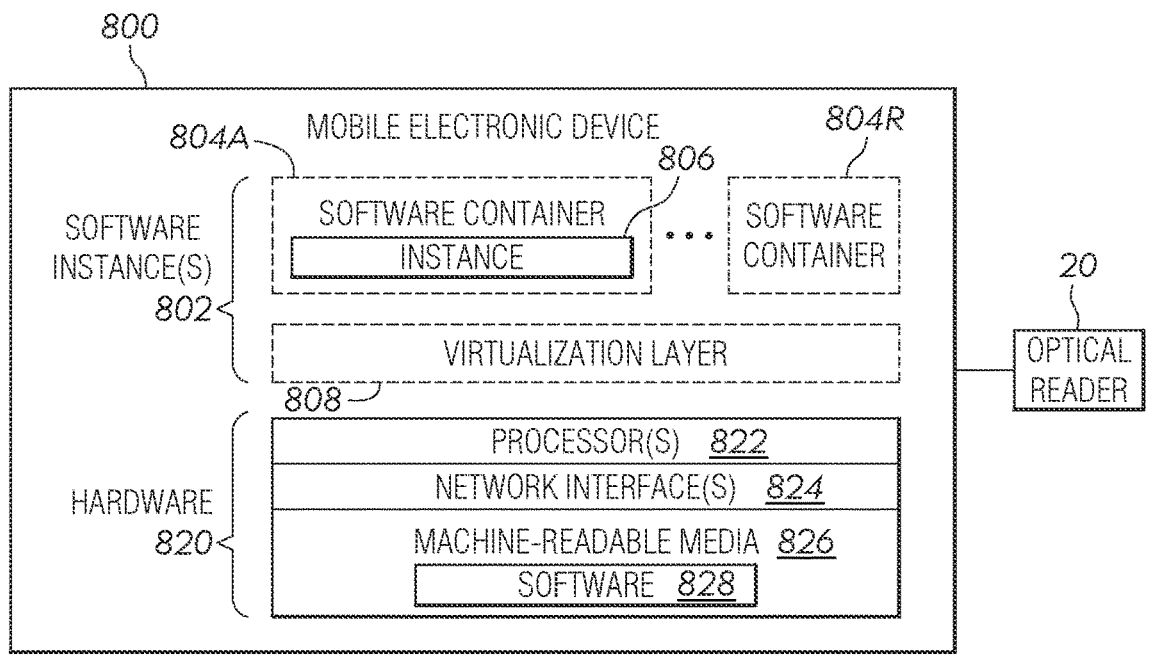
FIG. 8A illustrates an exemplary block diagram of elements of an exemplary mobile device of FIG. 1, according to some example implementations.

FIG. 8A is a block diagram illustrating elements of the electronic device of FIG. 1 according to some example implementations. FIG. 8A includes the mobile electronic device 800 coupled to the optical reader 20 (shown in FIG. 1) and includes hardware 820 contains a set of one or more processor(s) 822, a set of one or more network interfaces 824 (wireless and/or wired), and machine-readable media 826 having stored therein software 828 (which includes instructions executable by the set of one or more processor(s) 822). The machine-readable readable media 826 may include non-transitory and/or transitory machine-readable media. Each of the previously described clients and the glyph reconfiguring service may be implemented in one or more mobile electronic devices 800. In one implementation: 1) each of the clients is implemented in a separate one of the mobile electronic devices 800 (e.g., in end user devices where the software 828 represents the software to implement clients to interface directly and/or indirectly with the glyph configuring system for embedding the deeplink (e.g., software 828 represents a web browser, a native client, a portal, a command-line interface, and/or an application programming interface (API) based upon protocols such as Simple Object Access Protocol (SOAP), Representational State Transfer (REST), etc.)); 2) the glyph reconfiguring service is implemented in a separate set of one or more of the mobile electronic devices 800 (e.g., a set of one or more server devices where the software 828 represents the software to implement the glyph reconfiguring system); and 3) in operation, the electronic devices implementing the clients and the application for the glyph reconfiguring system would be communicatively coupled (e.g., by a network) and would establish between them (or through one or more other layers and/or or other services) connections for submitting requests to the server application and returning requests (i.e., reconfiguring of the glyph) for the display at the clients. Other configurations of mobile electronic devices may be used in other implementations (e.g., an implementation in which the client and optical reader to access the deeplink are implemented on a single one of mobile electronic device 800).

During operation, an instance of the software 828 (illustrated as instance 806 and referred to as a software instance; and in the more specific case of an application, as an application instance) is executed. In electronic devices that use compute virtualization, the set of one or more processor(s) 822 typically execute software to instantiate a virtualization layer 808 and one or more software container(s) 804A-804R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-804R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute, virtualization is used, during operation, an instance of the software 828 is executed within the software container 804A on the virtualization layer 808. In electronic devices where compute virtualization is not used, the instance 806 on top of a host operating system is executed on the "bare metal" mobile electronic device 800. The instantiation of the instance 806, as well as the virtualization layer 808 and software containers 804A-804R, if implemented, are collectively referred to as software instance(s) 802.

Alternative implementations of an electronic device may have numerous variations from those described above. For example, customized hardware and/or accelerators might also be used in an electronic device.

Example Environment

Figure 8B:
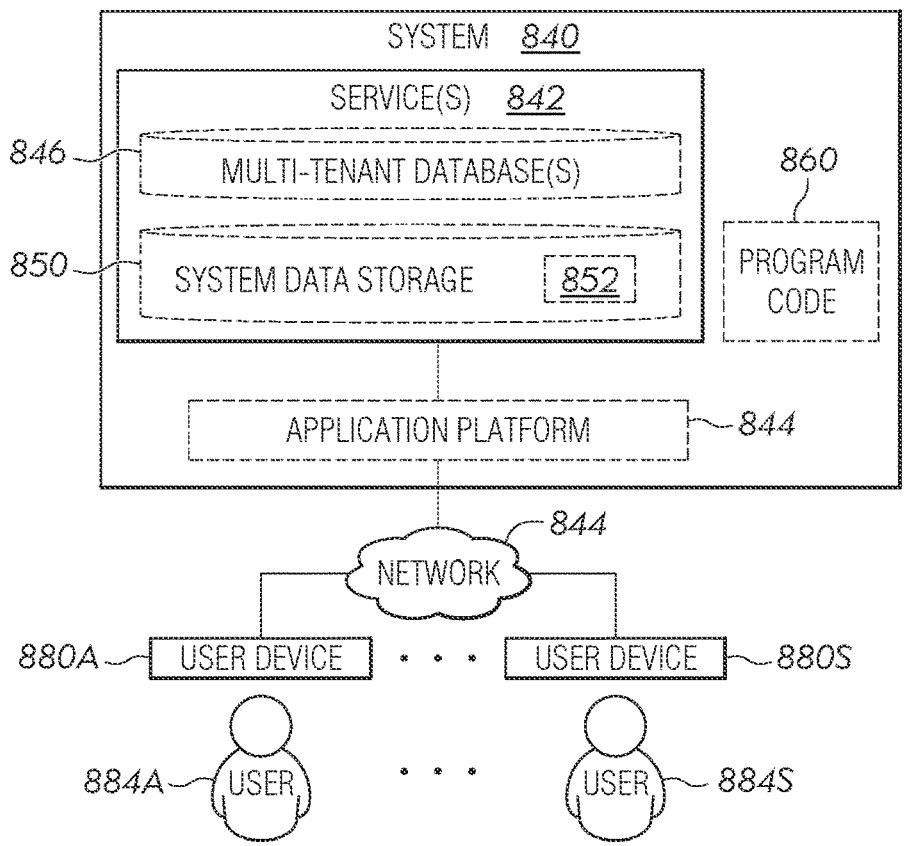
FIG. 8B illustrates an exemplary block diagram of a deployment environment of the multi-tenant server architecture of FIG. 1 according to some example implementations.

FIG. 8B is a block diagram of a deployment environment according to some example implementations of the multi-tenant architecture of the server system in FIG. 1. of the glyph display system in accordance with various embodiments. A system 840 includes hardware (e.g., a set of one or more server devices) and software to provide service(s) 842, including the glyph reconfiguration system and asset record/ asset profile database system. In some implementations, system 840 is in one or more data center(s). These datacenter(s) may be: 1) first-party datacenter(s), which are data center(s) owned and/or operated by the same entity that provides and/or operates some or all of the software that provides the service(s) 842; and/or 2) third-party datacenter(s), which are data center(s) owned and/or operated by one or more different entities than the entity that provides the service(s) 842 (e.g., the different entities may host some or all of the software provided and/or operated by the entity that provides the service(s) 842). For example, third-party data centers may be owned and/or operated by entities providing public cloud services (e.g., AMAZON-.COM®, Inc. (AMAZON® Web Services), GOOGLE® LLC (GOOGLE® Cloud Platform), MICROSOFT® Corporation (Azure)).

The system 840 is coupled to user devices 880A-880S over a network 882. The service(s) 842 may be on-demand services that are made available to one or more of the users 884A-884S working for one or more entities other than the entity which owns and/or operates the on-demand services (those users sometimes referred to as outside users) so that those entities need not be concerned with building and/or maintaining a system, but instead may make use of the service(s) 842 when needed (e.g., when needed by the users 884A-884S). The service(s) 842 may communicate with each other and/or with one or more of the user devices 880A-880S via one or more APIs (e.g., a REST API). In some implementations, the user devices 880A-880S are operated by users 884A-884S, and each may be operated as a client device and/or a server device. In some implementations, one or more of the user devices 880A-880S are separate ones of the mobile electronic device 800 or include one or more features of the mobile electronic device 800.

In some implementations, system 840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to as a multi-tenant system provider, operator, or vendor; or simply a provider, operator, or vendor) that provides one or more services to the tenants (in which case the tenants are customers of the operator and sometimes referred to as operator customers). A tenant includes a group of users who share common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant-specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data, and another set of tenants may be customers of different ones or all of the vendors' data. As another example, in the context of the platform as a Service (PAAS), one set of tenants may be third-party application developers providing applications/services, and another set of tenants may be customers of different ones or all of the third-party applications developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 840 is a multi-tenant cloud computing architecture supporting multiple services, such as one or more of the following types of services: glyph reconfiguring system; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 840 may include an application platform 844 that enables PAAS for creating, managing, and executing one or more applications (including the server-based glyph processing application and algorithm shown in FIG. 1) developed by the provider of the application platform 844, users accessing the system 840 via one or more of user devices 880A-880S, or third-party application developers accessing the system 840 via one or more of user devices 880A-880S.

In some implementations, one or more of the service(s) 842 may use one or more multi-tenant databases 846 (including the asset record and asset profile databases shown in FIG. 1), as well as system data storage 850 for system data 852 accessible to system 840. In certain implementations, the system 840 includes a set of one or more servers that are running on electronic server devices and that are configured to handle requests for any authorized user associated with any tenant (there is no server affinity for a user and/or tenant to a specific server). The user devices 880A-880S communicate with the server(s) of system 840 to request and update tenant-level data and system-level data hosted by system 840, and in response, the system 840 (e.g., one or more servers in system 840) automatically may generate one or more Structured Query Language (SQL) statements (e.g., one or more SQL queries) that are designed to access the desired information from the multi-tenant database(s) 846 and/or system data storage 850.

In some implementations, the service(s) 842 are implemented using virtual applications dynamically created at run time responsive to queries from the user devices 880A-880S and in accordance with metadata, including 1) metadata that describes constructs (e.g., forms, reports, workflows, user access privileges, business logic) that are common to multiple tenants; and/or 2) metadata that is tenant-specific and describes tenant-specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the glyph reconfiguring service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 882 may be anyone or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth-generation wireless protocol (5G), and/or similar wired and/or wireless protocols, and may include one or more intermediary devices for routing data between the system 840 and the user devices 880A-880S.

Each user device 880A-880S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touchpad, a touch screen, a pen or the like, video or touch-free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, to perform searches on stored data, and otherwise allow one or more users 884A-884S to interact with various GUI pages that may be presented to one or more of users 884A-884S. User devices 880A-880S might communicate with system 840 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 880A-880S might include an HTTP client, commonly referred to as a "browser," for sending and receiving HTTP messages to and from the server(s) of system 840, thus allowing users 884A-884S of the user devices 880A-880S to access, process and view information, pages, and applications available to it from system 840 over network 882.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, cooperate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
  accessing, by a first device communicatively coupled to a server of a database system over a network, a record of content associated with an asset via a deeplink embedded in a glyph associated with the asset;
  generating, by the server of the database system, a virtual application within a web browser at the first device, the virtual application comprising a first graphical user interface (GUI) display comprising graphical representations of a first set of values of one or more fields of the record associated with the asset, including a value of status of the asset, wherein the status of the asset is caused to change based on a schedule configured within an asset profile associated with the asset;

dynamically reconfiguring the glyph after a change in the first set of values of one or more fields of the record, resulting in redirection to updated values of the one or more fields of the record via an updated deeplink embedded in a reconfigured glyph;

receiving, at the database system, a request to access the record associated with the asset from a mobile device communicatively coupled to the database system over the network via the updated deeplink embedded in the reconfigured glyph; and redirecting a mobile client at the mobile device to a second GUI display via the updated deeplink, wherein:
the mobile device is different from the first device;
the second GUI display comprises second graphical representations of the updated values of the one or more fields of the record at the database system; and
the second GUI display of the mobile client is different from the first GUI display of the virtual application.

2. The method according to claim 1, wherein the record associated with the asset comprises a work order graphically represented in at least one of the first GUI display and the second GUI display.

3. The method according to claim 2, wherein a graphical representation of the work order comprises interactive buttons for user input to modify respective values of the one or more fields within the asset profile associated with the asset.

4. The method according to claim 3, wherein the at least one of the first GUI display and the second GUI display comprises a notification indicating the change to the record, and at least one of the interactive buttons is configured to either launch a new display comprising the change or to remain on the first GUI display without the change.

5. The method according to claim 1, further comprising:
automatically changing the status of the asset based on usage or timeline associated with the asset, according to a set of variables preprogrammed and configured in the asset profile.

6. The method according to claim 5, wherein the asset profile comprises at least asset product information.

7. The method according to claim 1, wherein redirecting the mobile client comprises opening the second GUI display comprising the second graphical representations of the updated values of the one or more fields of the record at the database system in a field service mobile client at the mobile device via the updated deeplink.

8. The method according to claim 7, wherein receiving the request comprises a scan operation using a camera or optical reader via a first client at the mobile device launching the request to the database system based on the updated deeplink prior to opening the second GUI display comprising the second graphical representations of the updated values of the one or more fields of the record at the database system in the field service mobile client at the mobile device.

9. The method according to claim 7, wherein the record associated with the asset comprises a work order, and wherein the at least one of the first GUI display and the second GUI display graphically represents the work order.

10. A system comprising:
a database;
a server having at least one processor; and
a non-transitory computer-readable storage medium associated with the at least one processor of the server, the non-transitory computer-readable storage medium storing processor-executable instructions that, when executed the at least one processor causes the system to perform a method, wherein the method comprising:

accessing, by a first device communicatively coupled to the system over a network, a record of content associated with an asset via a deeplink embedded in a glyph associated with the asset;

generating, by the server of a database system, a virtual application within a web browser at the first device, the virtual application comprising a first graphical user interface (GUI) display comprising graphical representations of a first set of values of one or more fields of the record associated with the asset, including a value of status of the asset, wherein the status of the asset is caused to change based on a schedule configured within an asset profile associated with the asset;

dynamically reconfiguring the glyph after a change in the first set of values of one or more fields of the record, resulting in redirection to updated values of the one or more fields of the record via an updated deeplink embedded in a reconfigured glyph;

receiving, at the database system, a request to access the record associated with the asset from a mobile device communicatively coupled to the database system over the network via the updated deeplink embedded in the reconfigured glyph; and redirecting a mobile client at the mobile device to a second GUI display via the updated deeplink, wherein:
the mobile device is different from the first device;
the second GUI display comprises second graphical representations of the updated values of the one or more fields of the record at the database system; and
the second GUI display of the mobile client is different from the first GUI display of the virtual application.

11. The system according to claim 10, wherein the first GUI display comprises a graphical representation of a work order comprising interactive buttons for receiving user input to modify one or more values of the one or more fields within the asset profile associated with the work order.

12. The system according to claim 11, wherein the asset profile comprises at least asset product information.

13. The system according to claim 11, wherein the at least one of the first GUI display and the second GUI display comprises a notification indicating the change to the record, and at least one of the interactive buttons is configured to either launch a new display comprising the change or to remain on the first GUI display without the change.

14. The system according to claim 10, wherein the at least one of the first GUI display and the second GUI display comprises an interactive button configured to upload an image associated with the asset.

15. At least one non-transitory machine-readable storage medium having executable instructions that, when executed by one or more processors of a server of a database system in communication with a first device and a second device over a network, cause the one or more processors to:

access, by the first device communicatively coupled to the server over the network, a record of content associated with an asset via a deeplink embedded in a glyph associated with the asset;

generate, by the server of the database system, a virtual application within a web browser at the first device, the virtual application comprising a first graphical user interface (GUI) display comprising graphical representations of a first set of values of one or more fields of the record associated with the asset, including a value of status of the asset, wherein the status of the asset is caused to change based on a schedule configured within an asset profile associated with the asset; and dynamically reconfigure the glyph after a change in the first set of values of one or more fields of the record, resulting in redirection to updated values of the one or more fields of the record via an updated deeplink embedded in a reconfigured glyph;

receive, at the database system, a request to access the record associated with the asset from a mobile device communicatively coupled to the database system over the network via the updated deeplink embedded in the reconfigured glyph; and redirect a mobile client at the mobile device to a second GUI display via the updated deeplink, wherein:

the mobile device is different from the first device;

the second GUI display comprises second graphical representations of the updated values of the one or more fields of the record at the database system; and the second GUI display of the mobile client is different from the first GUI display of the virtual application.

16. The at least one non-transitory machine-readable storage medium according to claim 15, wherein the record associated with the asset comprises a work order, and wherein the at least one of the first GUI display and the second GUI display graphically represents the work order.

17. The at least one non-transitory machine-readable storage medium according to claim 16, automatically changing the status of the asset based on usage or timeline associated with the asset, according to a set of variables preprogrammed and configured in the asset profile.

18. The at least one non-transitory machine-readable storage medium according to claim 17, wherein the asset profile comprises at least asset product information.

19. The at least one non-transitory machine-readable storage medium according to claim 16, wherein a graphical representation of the work order comprises interactive buttons for receiving user input to modify one or more values of the one or more fields within the asset profile associated with the work order.

20. The at least one non-transitory machine-readable storage medium according to claim 19, wherein the at least one of the first GUI display and the second GUI display comprises a notification indicating the change to the record, and at least one of the interactive buttons is configured to either launch a new display comprising the change or to remain on the first GUI display without the change.

21. The at least one non-transitory machine-readable storage medium according to claim 19, wherein the at least one of the first GUI display and the second GUI display comprises an interactive button configured to upload an image associated with the asset.

* * * * *